Jan. 18, 1938.   W. E. WATKINS   2,105,800
SUBIRRIGATION DEVICE
Filed Jan. 19, 1937
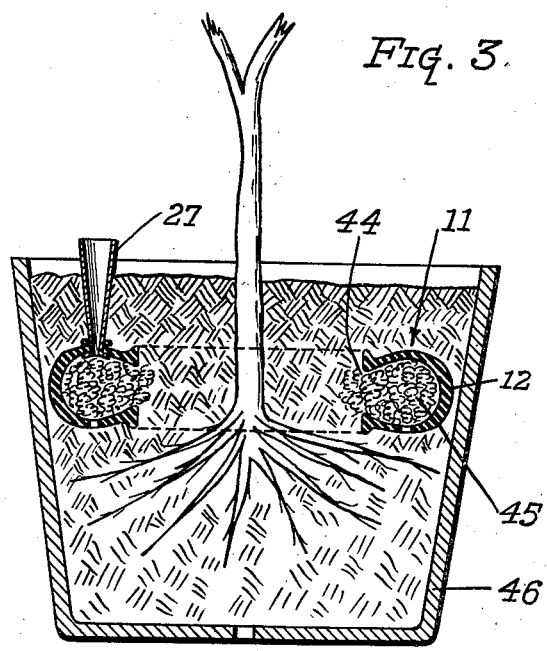
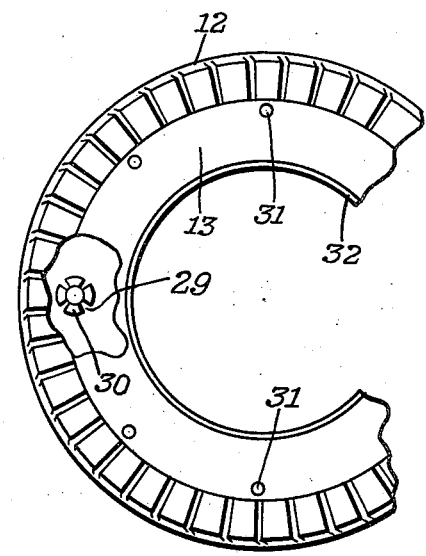
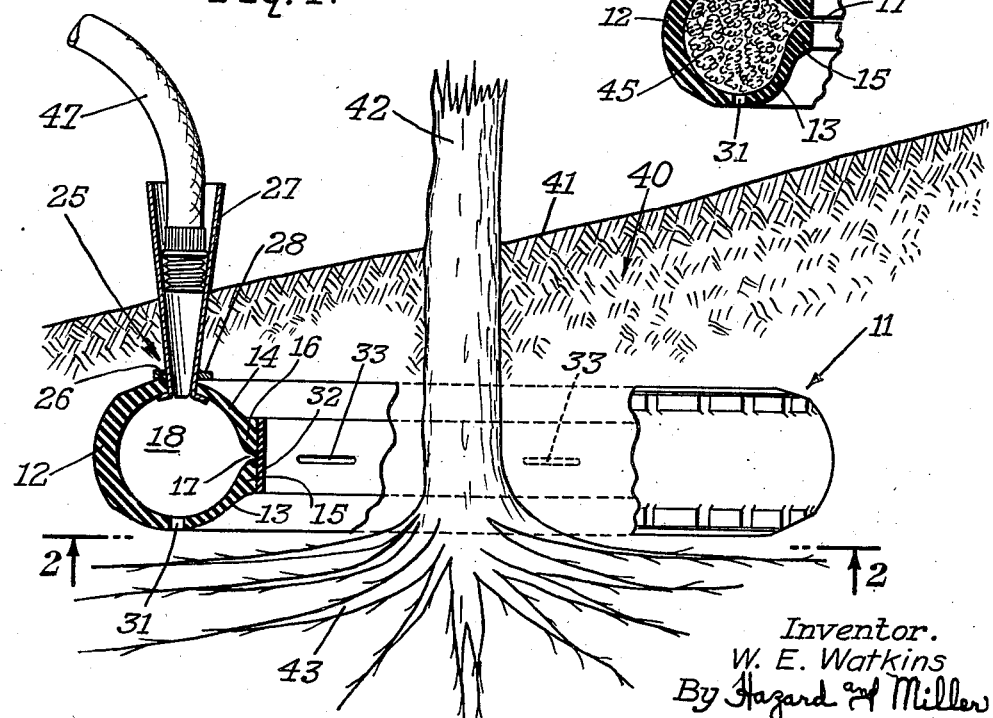
Inventor.
W. E. Watkins
By Hazard and Miller
Attorneys.

Patented Jan. 18, 1938

2,105,800

UNITED STATES PATENT OFFICE 2,105,800

SUBIRRIGATION DEVICE

William Elmer Watkins, Hemet, Calif.

Application January 19, 1937, Serial No. 121,313

10 Claims. (Cl. 47—48)

My invention relates to a sub-irrigation device particularly adapted for irrigating in a circle around the roots of shrubbery, small trees, flowers or vegetable or fruit crop.

An object and feature of my invention is a construction by which an inexpensive annular sub-irrigation device may be used, this being in the form of worn and discarded pneumatic tire casings in which the casing is buried in the ground surrounding the stem or the root portion of the plant. The casing when buried in the ground has its axis vertical and thus the diametrical plane through the casing substantially horizontal. Such construction positions the tread of the casing as an outer periphery of the irrigation device and the side walls of the casing forming the top and bottom. The portion at the beads may be positioned close together or spaced quite wide apart, in any case leaving an annular slot facing towards the trunk portion of the tree or the base of a shrub.

My invention further comprehends a simple manner of charging the sub-irrigation device, that is the discarded tire casing, with water by providing an aperture in the upper side wall to which aperture is connected a funnel or other means for flowing water into the casing. The lower side wall is provided with a number of perforations to give an even distribution of the water flowing around the casing. A further characteristic feature of my invention is that the lower side wall and the lower bead together with a portion of the tread form a lower annular trough for the circular flow of water from the charging funnel whereby the water is evenly distributed through the perforations. In addition my invention provides for a relatively quick distribution of water as water may be charged in and through the funnel at a higher rate than it will flow out of the perforations and this causes the water to flush through the annular slot between the beads, thus bringing the water quite close to the trunk of the tree or the root of a shrub but still not directly contacting these portions of the plant.

Another feature and characteristic of my invention is that the tire casing before being buried in the soil may be filled with a water absorbent and water retention material such as peat moss or other cellular material which holds and retains a large volume of water. Thus with my invention a relatively quick charge of water may be given to the soil at each casing. While water is being flushed into the casing even with the absorbent material therein there is a relatively quick flow out of the casing to the soil and the absorbent material holds a comparatively large volume of water which gradually seeps out of the apertures in the bottom side wall of the casing and also through the annular slot between the beads. It will also be apparent that if desired the annular space inside of the casing may be left open and the beads squeezed quite close together in burying the casing. While this gives an annular slot, it would, to a great extent, prevent entrance of soil into the casing, however, should the soil enter such casing, it is forced out by flushing water through the funnel into the casing and out through the slot between the beads and the perforations in the bottom.

Certain of the advantages of my invention result in an improved root growth of the plant on account of the moisture being charged into the ground at a depth below the ground surface depending on the character of the plant and its rooting characteristics, the water is carried deep below the surface and thus causes the plant to root deeply instead of a shallow rooting in which a plant tends to grow the roots towards the surface to tap the surface moisture. I find with my invention that the roots spread outwardly and mainly below the tire casing so that they tap the water supply which percolates from the perforations in the lower side wall of the casing. My invention also has an important application to plants such as nursery trees or shrubs which are kept by nurserymen for a considerable period of time in tubs or large boxes. In this case a tire casing with my equipment installed in the tub at the time of planting provides a means of distributing the water supply and maintaining a sufficient amount of water well below the surface of the soil so that a dry mulch may be maintained at the top of the tub, this lessening the evaporation from the tub or box while giving adequate water for the growth of the particular plant. It is manifest that in employing discarded pneumatic tire casings that these are quite inexpensive, frequently being of no marketable value or at best worth only a few cents. Should there be any blow-outs or wear through of the tread, it is desirable to make inexpensive patches so that the tread and at least the upper side wall of the casing will be impervious, causing all of the water to seep downwardly through the lower side wall or the annular space between the beads.

My invention is illustrated in connection with the accompanying drawing, in which:

Fig. 1 is a vertical section showing my sub-irrigator located in the soil surrounding a tree or the like, the application to sloping ground being illustrated. In this figure the beads of the tire casing are squeezed close together leaving a narrow annular slot.

Fig. 2 is a partial bottom view taken in the direction of the arrows 2 of Fig. 1, the roots of the tree or shrub being omitted.

Fig. 3 is a vertical section showing my invention installed in a tube or box in which a tree or shrub is grown. In this illustration the tire casing is illustrated as packed with a water absorbent material.

Fig. 4 is a vertical section showing the casing distorted.

In my invention I utilize a discarded worn out pneumatic tire casing designated by the numeral 11. In this description the same terminology is used as in describing tires, thus the outer peripheral portion is formed by the tread 12. The side walls 13 and 14 form the bottom and top respectively of the irrigator. The lower and upper beads 15 and 16 may be squeezed quite close together as shown in Fig. 1 but however leaving an annular slot 17. The casing thus forms a hollow annular chamber 18.

In using old or discarded casings these are generally decidedly worn as to the tread but may show but little wear on the side walls. The tread is usually worn to the fabric of the casing, nevertheless the casings have sufficient stiffness to hold a substantially rounded shape as to the interior when buried in the soil. It will be understood that they are not buried to a very great depth and hence the pressure due to the weight of the soil is comparatively little. Should there be any blow-outs or holes worn through the tread or other large openings, these should be sealed with an inexpensive enclosure such as by gummed sheet rubber or the like over the tear or opening.

The water supply arrangement designated by the numeral 25 is made by having an opening 26 in the upper side wall of the casing. This may be done by drilling a hole through the casing or cutting this with any suitable tool. A tapered funnel 27 preferably formed of metal has a washer 28 slipped over its small end and wedged on the funnel. The small end of the funnel has a series of longitudinal slits 29 so that the end portions after inserting this end through the opening 26 may be bent outwardly forming flanges 30 which engage the inside surface of the casing at the upper side wall. The slits are preferably of sufficient length so that the washer 28 will be wedged against the outside of the casing side wall and thus hold the funnel properly in position so that it will neither slip downwardly in the casing or be pulled away from the casing and therefore always forms a conical passage for flowing water for irrigation. The main outflow of water is through a series of openings or perforations 31 spaced around the lower side wall 13. These should be located in the lowermost portion of this. They also may be formed by a drill tool or by a cutting tool. Thus they are located at the bottom of an annular trough formed by the bottom side wall 13, a portion of the tread 12, the lower bead 15 and the portion of the casing between such bead and the lower side wall 13. It is obvious that the casing may be twisted slightly so that this bottom trough occupies more than half of the close sectional area of the annular chamber 18. It is not intended that the beads be secured together. However if desired a strip of rubber 32 may be cemented to these beads when it is desired to form a complete closure. Such rubber could then be slotted as indicated at 33. This arrangement would form a complete circular water chamber of the full cross section of the inside of the casing. However this would add to the expense and the casing with an open annular space such as 17 between the beads is satisfactory.

In the illustration of Fig. 1 the ground or soil in which the plant grows is indicated by the numeral 40, the ground surface 41 is shown as sloping, the casing is preferably located with its diametrical plane horizontal. The trunk of a tree or shrub is indicated at 42 having spreading roots 43. The casing with the connected funnel may be buried in the ground either during the time of planting the tree or shrub in which case if it has a relatively large head, may be fitted over the roots. The ground is then filled in and compacted around the roots of the plant and the casing, thus burying this latter in the ground with the top of the open funnel above the surface of the ground.

In Fig. 3 I show another use of my invention. In this case the casing 11 is shown with the beads widely spaced apart forming the wide annular space 44. In order to hold the casing in this position it is desirable to have a packing or filling 45 of water absorbent material such as peat moss or other cellular material. This is of particular advantage where the plant is placed in a tub or box indicated at 46. In this case the casing is located below the surface of the soil in the tub with the funnel extending above the surface.

In the use of my invention water is charged into the funnel as for instance by a hose 47 (note Fig. 1). This water flows around the inside of the casing and the main portion passes outwardly through the perforations 31 in the bottom of the casing. If the casing is shown with the beads secured together, a substantially cylindrical water space is provided which in itself holds quite a large volume of water. However as above mentioned, it is much less expensive to omit the sealing strip 32 and to have the beads substantially contacting but with an annular space 17. Then a certain amount of the water seeps out of this space until the water level in the chamber 18 reaches such level. An important characteristic of my invention is that whether or no the beads are close together or spaced apart and should soil work into the chamber 18, this will be flushed out when applying water through the funnel. While a certain amount of the soil is probably washed through the bottom perforations 31, most of this appears to be washed out through the annular space 17. Thus in a comparatively short time a relatively large volume of water proportionate to the requirements of the particular plant may be charged into the casing and this will slowly seep into the ground. As the ground surface is thus kept quite dry, the water level in the soil is spaced well below the surface so that I find that the roots in seeking the moisture grow laterally and spread below the bottom of the casing. The root system of the tree or shrub is thus protected from the heat in hot weather.

An advantage of using my sub-irrigator for plants in tubs or boxes resides in part in the difficulty of keeping these properly watered on account of the large surface of evaporation from the walls of the tub and also the top surface of the soil. Therefore by using my invention, particularly if the casing is packed with a water absorbent material such as peat moss or the like, the water may be charged into the casing and thus thoroughly saturate the moss and after saturation water may be continued to flow until the soil in the tub is moistened to the desired extent. Then the water gradually seeping from the absorbent material maintains the soil in the tub moist so that a dry mulch may be maintained on the top surface, thus lessening the loss of water by evaporation. It will be understood however that when used in tubs, the beads may be pressed close together if desired and a packing of water absorbent material may be used with the beads close together or spaced wide apart as the circumstances show to be best.
In Fig. 4 I show a manner of placing the tire casing in the ground, this being somewhat distorted in which the lower side wall 13 is bent upwardly much more than as shown in Fig. 1 and the upper side wall 14 is somewhat flattened.
This locates the annular slot 17 much above the center of the tire, thus forming a larger annular trough below this slot for carrying water. In this figure a filling of porous material such as peat moss is illustrated and such filling is operative to hold the casing in proper shape when buried in the ground. Of course it is obvious that the filler may be omitted. Thus in initially watering plants a quantity of water may be used so that this will flow out of the bottom perforations and also the annular slot 34 and when the water is shut off it leaves a relatively large volume in the casing below the slot 17.

Another important characteristic of my invention is that the pneumatic tire casings when buried in the ground for use as indicated in my invention are practically indestructible, for although a few of the cotton fibers which may be exposed to water and air may rot, the rubber does not deteriorate as it is protected from light and heat and moreover the rubber being always moist is maintained from deterioration. It will be obvious that my invention may be employed for applying liquid fertilizers practically directly to the roots of the plant or in an area tapped by the roots so that there will be but little waste of such fertilizer. My invention also has another valuable function as when the water drains out of the casings these become filled with air and the air follows the receding moisture into the soil thus providing the necessary oxygen required by the roots of the plants.

Various changes may be made in the details of the construction without departing from the spirit or scope of the invention as defined by the appended claims.

I claim:
1. In a device as described, the combination of a flexible circular conduit adapted for burial in the ground surrounding a tree or shrub, a funnel connected to the upper side of the conduit and extending above the ground level for charging the conduit with water, the conduit having openings in the bottom for seepage of water to the soil, the conduit on account of its flexibility being adapted to be slightly distorted in the ground, the conduit having an annular slot facing towards the tree or shrub.

2. In a device as described, the combination of a flexible circular conduit adapted for burial in the ground surrounding a tree or shrub, a funnel connected to the upper side of the conduit and extending above the ground level for charging the conduit with water, the conduit having openings in the bottom for seepage of water to the soil, the conduit on account of its flexibility being adapted to be slightly distorted in the ground, the conduit having a filling of water absorbent material, said filling being adapted to prevent collapsing of the conduit due to the weight of the soil thereon.

3. In a device as described, the combination of an annular conduit constructed principally with walls of rubber and fabric of sufficient stiffness to prevent collapsing of the conduit when buried in the soil, the annular conduit being adapted to be buried in the soil surrounding the base of a tree or shrub, a funnel connected to the upper side of the conduit and extending above the ground surface, the lower portion of the conduit having a series of openings for seepage of water, the funnel having an outwardly turned flange positioned inside of the conduit to prevent the funnel being disengaged from said conduit and interengaging means between the funnel and the outside of the conduit to prevent the funnel being depressed to too great an extent in the conduit.

4. In a device as described, the combination of a discarded pneumatic tire casing having an opening in an upper side wall, a water charging device connected at the said opening whereby the casing may be buried in the soil to surround the base of a tree or shrub, the water charging device extending above the ground level for supply of water, the bead portion of the casing being towards the base of the tree or shrub.

5. In a device as described, the combination of a worn pneumatic tire casing of a type unfit for use on a wheel, said casing having a hole in an upper side wall, a funnel fitted in said opening, means to attach the funnel to the side wall preventing disengagement of the funnel from the casing or the thrusting of the funnel into the interior of the casing, the casing being adapted to be buried in the ground to surround the base of a tree or shrub and the funnel to extend above the ground surface for charging the casing with water, the beads of the casing being towards the center and defining an annular space directed towards the base of the tree or shrub.

6. In a device as described and claimed in claim 5, the lower side wall of the casing with part of the tread and the portion adjacent a lower bead forming an annular trough, there being perforations in the lower side wall for downward seepage of water.

7. In a device as described and claimed in claim 5, a water absorbent material packed in the casing to retain water for slow percolation after the supply of water has been discontinued.

8. In a device as described, the combination of a worn pneumatic tire casing of a character unfit for use on a wheel, said casing having a perforation in the upper side wall, a funnel extending through said perforation and having a flanged end engaging the inside of said side wall adjacent the perforation to prevent the funnel being disengaged from the casing, a washer wedged on the funnel and engaging the outside of the casing to prevent the funnel being thrust downwardly in such casing, the lower side wall of the casing having perforations, the casing being adapted to be buried in the ground surrounding the base of a tree or shrub with the funnel extending above the ground surface to receive a supply of water, the beads of the casing defining an annular slot opening towards the base of the tree or shrub.

9. In a device as described and claimed in claim 8, a cover strip secured to the beads of the casing and forming a cover for the said slot whereby the interior of the casing with the rubber strip forms a circular annular space for reception and distribution of water.

10. In a device as described and claimed in claim 8, the interior of the casing having a packing of water absorbent material, said packing being adapted to retain the beads spaced apart a desired distance whereby by regulating the amount of the packing the width of the annular slot between the beads may be regulated.

WILLIAM ELMER WATKINS.